UNITED STATES PATENT OFFICE.

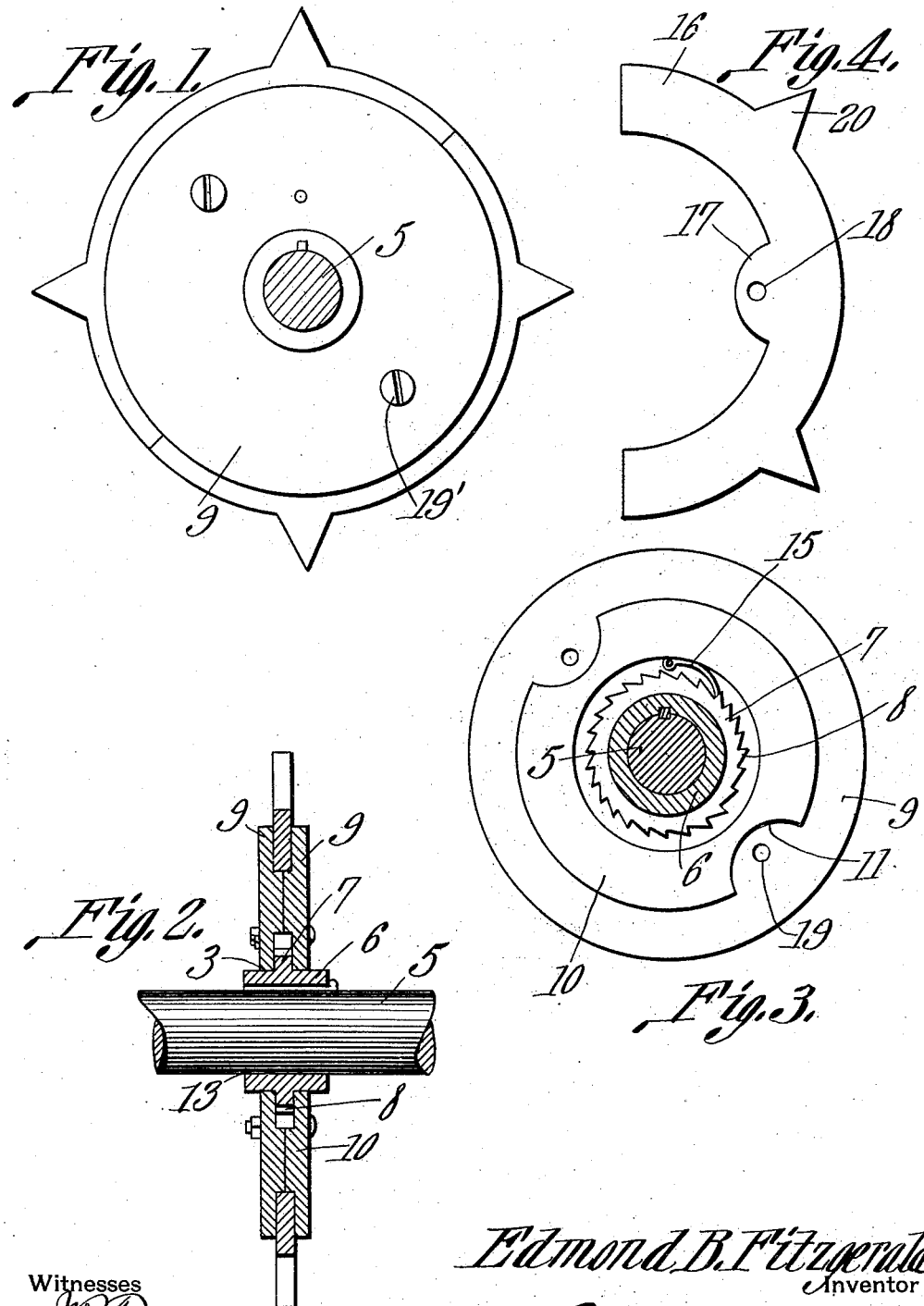

EDMOND B. FITZGERALD, OF ROSEDALE, MISSISSIPPI.

SECTIONAL WHEEL.

987,224.  Specification of Letters Patent.  Patented Mar. 21, 1911.

Application filed August 8, 1910. Serial No. 576,135.

*To all whom it may concern:*

Be it known that I, EDMOND B. FITZGERALD, a citizen of the United States, residing at Rosedale, in the county of Bolivar and State of Mississippi, have invented a new and useful Sectional Wheel, of which the following is a specification.

It is the object of the present invention to provide an improved actuating device for the valve plate of a seeder of that general type shown and described in my copending application, Serial No. 531,679, filed December 6, 1909. Such seeders embody usually, a trip arm having operative connection with the valve disk and such trip arm is to be successively engaged by suitably spaced abutments upon a rotating element or some other actuating means.

The present invention relates to an improvement in the construction of such actuating means, and the device of this invention is embodied in a pair of spaced connected disks mounted upon a rotating element, such as the axle of the machine, the disks receiving between them segments formed with teeth or abutments arranged to engage successively with a trip arm which is mounted to rock and has connection with one of the valve plates.

In the accompanying drawings, Figure 1 is a view in side elevation of the actuating means for the trip arm of a seeder of the type mentioned, Fig. 2 is a transverse sectional view through the said means, Fig. 3 is a sectional view in a plane at right angles to the plane of Fig. 2, and Fig. 4 is a view in side elevation of one of the toothed segments of the device.

The device of the present invention, as before stated, is embodied in a trip wheel which is mounted upon the axle of the machine, and the said axle is indicated in the drawings by the numeral 5. In mounting the device upon the axle, the hub 6 is keyed or otherwise secured upon the axle for rotation therewith and is formed midway of its ends with a circumferential flange 7 which is toothed, as at 8, peripherally, whereby to afford a ratchet. The trip wheel embodies two disks which are fitted upon the hub in spaced relation and each of these disks is formed upon that face opposing the other disk, with a raised portion 10, substantially annular in form and concentric with respect to the axle 5 and formed at diametrically opposite points with notches 11 for a purpose to be explained. Each disk has an axial opening 13 which receives the hub 6 in such manner to permit of rotation of the disks upon the said hub independently thereof. It will be observed from an inspection of Fig. 2 of the drawings that when the disks are assembled and connected upon the hub, their raised portions 10 will register or be in contact and consequently what might be termed an annular flange is afforded between the two disks.

A pawl 15 is secured between the abutting raised portions 10 of the disks and rests at its free end in engagement with the toothed periphery of the flange 7 of the hub and coöperates with the teeth of the said flange to insure rotation of the disks with the shaft when the shaft is rotated forwardly, but obviates such movement when the shaft is rotated backwardly.

As heretofore stated, the segments are disposed between the disks and carry teeth or abutments which coöperate with the rocking arm of the seeder mechanism in connection with which the actuating means here shown, is employed and one of these segments is clearly shown in Fig. 4 of the drawings and is indicated by the numeral 16. It will be observed that the segment 16 is semi-annular in form and integral with its concave edge is formed an ear 17 of a shape to fit in one or the other of the notches 11 and through this ear is formed an opening which registers with an opening 19 formed through each of the disks 9 in the bounds of the concave edge of the notches 11 in the raised portion 10 thereof. With the two segments assembled between the disks with their ends abutting as illustrated in Fig. 1 of the drawings, securing bolts or screws 19' are secured through the registering openings 18 and 19 and the said segments are in this manner firmly held in place. It will be observed that the teeth heretofore mentioned as constituting a part of each segment, and indicated in the drawings by the numeral 20, are two in number upon each segment here illustrated and are formed upon the outer or convex edge of the segment but it will be readily understood that while this number of teeth, they being equidistantly spaced, will result in a predetermined quantity of seed being dropped at each movement through 90° of the actuating wheel as an entirety, and consequently a dropping of a predetermined quantity of seed at a predetermined number of inches apart, a greater or less number of teeth may be employed whereby to cause the seed to be deposited in quantities located a greater or less distance apart. In other words, the device as placed upon the market will embody a set of the segments 16 so that they may be interchanged as desired.

What is claimed is:—

1. In an actuating device of the class described, a pair of disks each formed upon one face with a raised portion having notches, the said disks each having an opening located within the notch, the disks being disposed with their raised portions abutting, two segments fitted between the disks and having ears seating in the notches in the raised portions of the disks, and bolts secured through the openings in the disks and the ears of the segments.

2. In an actuating device of the class described, a pair of disks each formed upon one face with a raised portion having notches, the said disks each having an opening located within the notch, the disks being disposed with their raised portions abutting, two segments fitted between the disks and having ears seating in the notches in the raised portions of the disks, bolts secured through the openings in the disks and the ears of the segments, a ratchet arranged axially of the disks and rotatable independently thereof, the said raised portions of the disks being annular in form and housing the said ratchet, and a pawl carried between the disks within the raised portions thereof and coöperating with said ratchet.

In testimony that I claim the foregoing as my own, I have hereto affixed my signature in the presence of two witnesses.

EDMOND B. FITZGERALD.

Witnesses:
H. D. CHANNY,
JNO. CATCHINGS.

---

Copies of this patent may be obtained for five cents each, by addressing the "Commissioner of Patents, Washington, D. C."